Aug. 27, 1968     W. R. E. HENSEL     3,398,818
CONTINUOUS BRAKE FOR VEHICLES, ESPECIALLY MOTOR VEHICLES
Filed July 20, 1966
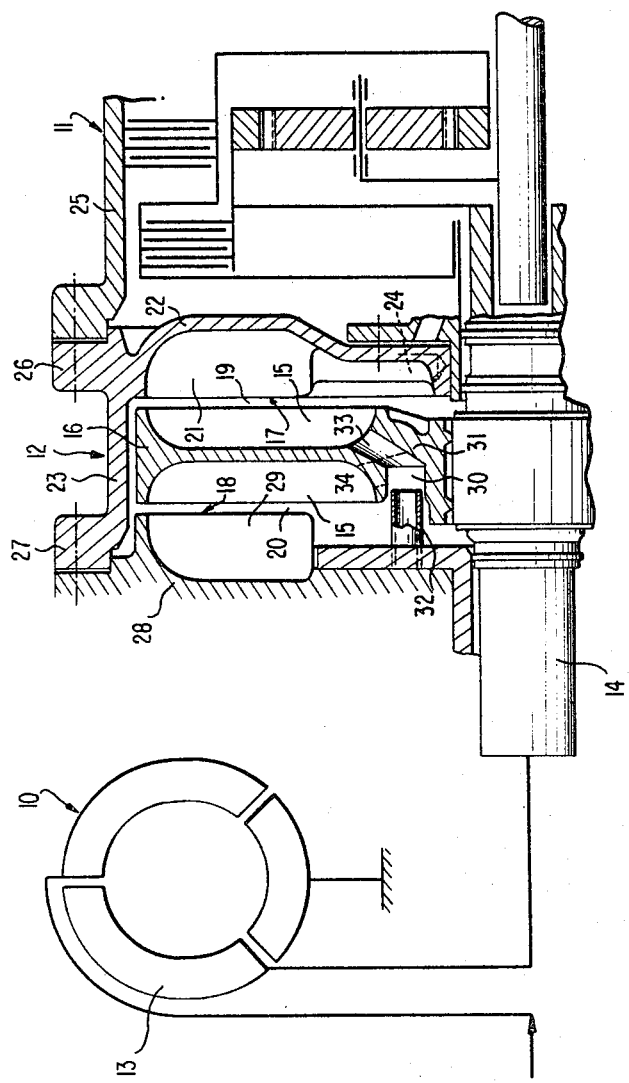
INVENTOR.
WERNER R. E. HENSEL
BY
ATTORNEYS

# United States Patent Office 3,398,818
Patented Aug. 27, 1968

3,398,818
CONTINUOUS BRAKE FOR VEHICLES, ESPECIALLY MOTOR VEHICLES
Werner R. E. Hensel, Fellbach, Wurttemberg, Germany, assignor to Daimler-Benz Aktiengesellschaft, Stuttgart-Unterturkheim, Germany
Filed July 20, 1966, Ser. No. 566,524
Claims priority, application Germany, July 24, 1965, D 47,825
2 Claims. (Cl. 192—3.34)

ABSTRACT OF THE DISCLOSURE

A vehicle power assembly having a continuous hydrodynamic brake drivingly connected between the hydrodynamic torque converter and change-speed gear transmission, which brake has a housing with a connecting flange on the torque converter side that is substantially identical to the change-speed gear transmission connecting flange and has a connecting flange on the transmission side that is substantially identical to the torque converter housing flange so that alternatively the torque converter housing may be connected directly to the transmission housing without the interposition of the hydrodynamic brake in the manufacture of vehicles or the hydrodynamic brake may be inserted into the drive path of an existing vehicle. Preferably, the brake is of double construction with the impeller having blade set on both axial sides cooperating with corresponding stationary blade sets to form two working chambers with the impeller hub having an axially facing annular groove cooperating with a supply pressure line terminating therein.

Background of the invention

A continuous brake, that is, a brake with a continously rotating impeller, is known in the prior art which is arranged to the rear of the motor vehicle change-speed gear whereby the first set of blades rotates in unison with the driven or output shaft of the change-speed gear. The rotational speed of the driven or output shaft, however, is relatively low—primarily with the customary comparatively low speeds of the vehicle for safety reasons on downhill grades—so that as a result thereof the brake force of the continuous brake dependent essentially on this rotational speed is correspondingly small. One has eliminated this disadvantage with the known continuous brake by a relatively large construction thereof, but had to accept instead the disadvantage of large space requirements connected with these large dimensions. Furthermore, such a comparatively extensive and large continuous brake requires disadvantageously a correspondingly large amount of working medium which in turn, of course, entails correspondingly long filling and discharge periods. As a result thereof, the aforementioned prior art continuous brake possesses an undesirably large inertia in its control, which—if not rendering altogether impossible—renders considerably more difficult an alternating rapid engagement and disengagement of the continuous brake.

Summary of the invention

The present invention now aims at avoiding the aforementioned disadvantages and therebeyond to achieve the advantages to be described more fully hereinafter. As solution to the underlying problems, the present invention proposes that the hydrodynamic coupling be arranged in the drive connection or power path between the driving engine and the motor vehicle change-speed gear or transmission.

By the arrangement according to the present invention of the hydrodynamic coupling in front of the change-speed gear a considerably increased brake effect can be achieved with the same dimensions of the coupling because the rotational speed—especially in the lower transmission speeds—is now increased considerably by the transmission ratio of the change-speed gear. Consequently, in an advantageous manner, the brake force is no longer directly dependent on the vehicle speed but essentially from the selection of the engaged speed or transmission ratio. Since one normally drives anyhow in the lower speed range on a downhill grade, a good brake output or brake power is assured on a downhill road by the aforementioned inventive concepts.

Of course, it is also possible and thus completely falls within the scope of the present invention to additionally increase the brake power or output by additional measures. Thus, it would be quite feasible to vary in a step-like manner the filling pressure of the hydrodynamic coupling corresponding to the changing transmission ratio whereby this pressure variation can be initiated simultaneously with the change of the transmission ratio or speed. A constant brake power or output may be achieved by an appropriate matching of the filling pressure to the respective transmission ratio.

Furthermore, the possibility is left to the designer or engineer by the arrangement of the hydrodynamic coupling according to the present invention to construct the same relatively small—with the same brake power or output as the aforementioned prior art continuous brake—so that the disadvantages of large space and material requirements as well as the inertia during engagement and disengagement thereof are obviated. In that connection, the present invention for example, proposes that the housing accommodating the hydrodynamic coupling lies with its dimensions within the contours or outlines of the change-speed transmission. The coupling housing thereby adjoins harmoniously the housing of the change-speed transmission without requiring special measures for the accommodation of the former. In case a hydrodynamic transmission section, for example, a torque converter is arranged between the change-speed transmission and the engine, the present invention proposes for the reasons mentioned above that the hydrodynamic coupling be located between the hydrodynamic transmission section and the change-speed transmission.

The construction of the hydrodynamic coupling, as to its details, may be left in principle to the direction of the designer and engineer. However, the hydrodynamic coupling, in its preferred realization, is constructed according to the present invention, as an essentially disc-shaped structural part in its external contours with similar connecting flanges on both sides thereof. The advantage of this proposal according to the present invention resides in the possibility to install the hydrodynamic coupling subsequently into already existing transmissions. Furthermore, the same transmission housings may be used advantageously for the transmissions with or without pre-connected hydrodynamic coupling.

The construction of the inner parts of the hydrodynamic coupling, within the frame of the aforementioned basic type of construction, is also left completely at the discretion of the designer and engineer. For example, the coupling may be constructed single, i.e., the blade set rotating with the drive connection as well as the blade set fixed to the housing each consists of one wheel or rotor provided with blades on one side thereof. However, the present invention proposes preferably that the hydrodynamic coupling is of double construction whereby the rotating blade set consists of a rotor or wheel provided with blades on both sides thereof and is arranged between two fixed wheels of the second blade set, each provided with blades on one side thereof so that the hydrodynamic coupling is provided with two working spaces. The blading of the blade sets may thereby be arranged straight or—for purposes of increasing the brake power—may be disposed at an inclination in the forward direction of rotation.

This double construction of the hydrodynamic coupling has the advantage that the two axial thrusts acting on the rotating blade wheel mutually equalize each other without special means. Furthermore, a hydrodynamic coupling of such double construction and correspondingly producing a double brake power or output, by no means must also have twice the axial dimensions with respect to a hydrodynamic coupling of single construction having the same radial dimensions. According to a proposal of the present invention, the axial dimensions may be kept particularly small in that the blade wheel fixed at the housing and facing the change-speed transmission is arranged within a housing part flangedly connected to the change-speed transmisison and serving simultaneously as partition wall between the change-speed transmission and the hydrodynamic coupling, which housing part at the same time surrounds the rotating blade wheel, and in that the other blade wheel fixed at the housing is arranged in a cover which is flangedly connected at the open end face of the housing part, and in that the cover serves simultaneously as partition wall between the hydrodynamic coupling and the hydrodynamic transmission section.

The filling of the hydrodynamic coupling takes place appropriately by means of a conventional control device from a pressure medium storage tank, reservoir or the like. In the event that the change-speed transmission is shifted by means of a pressure medium, the present invention proposes that the hydrodynamic coupling and the change-speed transmission are connected to the same pressure medium system. Thus, the filling of the coupling may take place advantageously from a reservoir or tank in communication with the transmission oil sump or also directly by means of the transmission oil pump.

The introduction of the pressure medium into the two working spaces of the hydrodynamic coupling and the emptying thereof is to take place according to another proposal of the present invention in that, for purposes of filling, an annular groove is provided in the hub of the rotating blade wheel into which discharges an axially directed pressure line connection, and in that, for purposes of the discharge of the working medium out of the working spaces, essentially tangentially extending channels are arranged at the circumference of the working spaces.

Accordingly, it is an object of the present invention to provide a continuous brake for vehicles, especially motor vehicles, which eliminates by extremely simple means, the aforementioned shortcomings and drawbacks encountered with the prior art constructions.

It is another object of the present invention to provide a continuous brake for motor vehicles in which a relatively high braking power is achieved without increasing the dimensions of the brake.

A further object of the present invention resides in a continuous brake for vehicles, especially motor vehicles, whose dimensions can be kept relatively small without sacrifice in brake output while at the same time minimizing the amount of working medium necessary for proper operation thereof.

Still a further object of the present invention resides in a continuous brake for motor vehicles of the type described above which permits an elimination of the inertia in the control thereof as regards engagement and disengagement of the brake.

Another object of the present invention resides in a continous brake for motor vehicles in which the brake force is no longer directly dependent on the vehicle velocity but instead essentially from the selection of the particular engaged transmission ratio.

A further object of the present invention resides in a continuous brake of the type described above which also permits the attainment of a substantially constant brake output by appropriate matching of the filling pressure to the respective prevailing transmission ratio of the change-speed gear.

Still another object of the present invention resides in a continuous brake which is so constructed and arranged as to permit installation into existing vehicle transmissions.

A still further object of the present invention resides in a continuous brake for motor vehicles which greatly simplifies the manufacture of the transmission while permitting the use of the same transmission housing for transmissions with or without pre-connected hydrodynamic coupling.

Another object of the present invention resides in a continuous brake for vehicles, especially motor vehicles, in which the axial thrusts acting on the rotating blade wheel are automatically compensated and equalized without substantial increase in the dimensions of the brake.

*Brief description of the drawing*

These and further objects, features, and advantages of the present invention will become more obivous from the following description when taken in connection with the accompanying drawing which shows, for purposes of illustration only, one embodiment in accordance with the present invention, and wherein:

The single figure is a longitudinal cross-sectional view through a part of the drive connection of a motor vehicle illustrating the continuous brake in accordance with the present invention.

*Detailed description of the drawing*

Referring now to the single figure of the drawing, reference numeral 10 generally designates a schematically shown hydrodynamic transmission section while reference numeral 11 generally designates a portion of a known mechanical change-speed transmission adapted to be shifted by means of a pressure medium in a conventional manner. A continuous brake generally deisgnated by reference numeral 12 and constructed in the manner of a hydrodynamic coupling is arranged in the drive connection or power path of a motor vehicle consisting of a driving engine (not shown), of the hydrodynamic transmission section 10 and of the change-speed gear 11 and more particularly is arranged between the hydrodynamic transmission section 10 and the change-speed gear 11. The hydrodynamic coupling 12 is of double construction and consists of a blade wheel 16 provided with blades 15 on both sides thereof, which is secured on and rotates together with the shaft 14 coordinated to the turbine wheel 13 of the torque converter 10, and of two fixed or stationary blade wheels generally designated by reference numerals 17 and 18 each provided with blades on only one side and fixed to the housing. The rotating blade wheel 16 forms together with the fixed blade wheels 17 and 18 two working spaces 19 and 20. The blades 21 of the fixed blade wheel 17 are cast into the end wall 22 of a housing part 23 which serves at the same time as partition wall against the change-speed transmission 11. Furthermore, the end wall 22 additionally serves for the accommodation of channels 24 for the supply of the pressure medium to the shifting members of the change-speed gear 11.

The housing part 23, which is matched in its contours to the housing 25 of the change-speed gear 11 and surrounds the rotating blade wheel 16, is provided with two identical flanges 26 and 27 whereby the flange 26 serves for the securing of the housing part 23 at the change-speed gear housing 25. A cover 28 is secured at the flange 27 into which are cast the blades 29 of the fixed blade wheel 18. This appropriate arrangement of the fixed blades 29 and 21 in the covers 28 and 22, respectively, represents advantageously a further decrease of the axial dimensions of the continuous brake 12. Simultaneously therewith, the cover 28 serves as partition wall against the hydrodynamic transmission part 10.

The filling of the work spaces 19 and 21 with working medium takes place from a conventional pressure medium system (not illustrated), which is common to the continuous brake 12 and to the change-speed transmission 11, by way of an axially directed pressure line connection 32 terminating in an annular groove 30 provided within the hub portion 31 of the rotating blade wheel 16. Essentially radial bores 33 and 34 extend from the annular groove 30 which supply the working medium to the working spaces 19 and 20.

The axial thrust occurring in the working spaces 19 and 20 is advantageously compensated for by the symmetric arrangement of the rotating blade wheels 16 so that no special measures need to be taken for the axial fixation thereof, which contributes to the reduction of the axial dimension of the continuous brake 12. The axial extent of the continuous brake 12 is already kept relatively small anyhow in that the rotating blade wheel 16 itself forms the partition wall between the working spaces 19 and 20.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A vehicle power assembly, comprising: a driving engine; driven wheels; a change-speed gear transmission drivingly connected between the driving engine and the driven wheels; a hydrodynamic torque converter drivingly connected in the power path between the driving engine and the change-speed gear transmission; a continuous hydrodynamic brake drivingly connected in the power path between the hydrodynamic torque converter and the change-speed gear transmission having first blade means drivingly and rotatably connected in the power path, and second relatively stationary blade means; said hydrodynamic brake having a housing with connecting flanges on both axial opposite sides thereof; said change-speed gear transmission and said hydrodynamic torque converter each having a housing with a connecting flange on the axial side adjacent the other for connection with said flanges of said hydrodynamic brake housing; the connecting flange of said change-speed gear transmission housing being substantially identical to the connecting flange of said hydrodynamic brake housing that is adjacent said hydrodynamic torque converter; the connecting flange of said hydrodynamic torque converter housing being substantially identical to the connecting flange of said hydrodynamic brake housing that is adjacent said change-speed gear transmission so that said hydrodynamic torque converter housing may be directly connected to said change-speed gear transmission housing without the interposition of said hydrodynamic brake.

2. The assembly of claim 1, wherein said hydrodynamic brake is of double construction with said first blade means including a rotatable impeller wheel provided with a hub and blade sets on both axial sides thereof; said second blade means including two relatively stationary reactor wheels each provided with blade sets on one axial side thereof facing said rotatable impeller wheel; said rotatable impeller wheel is disposed between the two stationary reactor wheels to form two brake working spaces, each formed between a respective stationary reactor wheel and one set of blades of the rotating impeller wheel; said hydrodynamic brake including means filling the two working spaces having an axially facing annular grove within the hub of the rotaing blade wheel, axially directed supply pressure line connecting means terminating in said annular groove, and essentially tangentially extending channel means arranged at the circumference of the working spaces for discharge of the working spaces.

References Cited

UNITED STATES PATENTS

| 2,963,118 | 12/1960 | Booth et al. | 188—90 |
| 3,291,268 | 12/1966 | Nagel | 192—4 |
| 3,319,746 | 6/1967 | Christenson | 192—9 |

MARTIN P. SCHWADRON, *Primary Examiner.*

C. LEEDOM, *Assistant Examiner.*